United States Patent [19]

Harpole

[11] Patent Number: 5,229,100
[45] Date of Patent: Jul. 20, 1993

[54] ROTATING DISK SINGLET OXYGEN GENERATOR

[75] Inventor: George M. Harpole, Los Angeles, Calif.

[73] Assignee: The United States of America as represented by the Secretary of the Air Force, Washington, D.C.

[21] Appl. No.: 208,698

[22] Filed: Jun. 13, 1988

[51] Int. Cl.$^5$ .............................................. C01B 13/00
[52] U.S. Cl. ...................................... 423/579; 372/55; 422/122
[58] Field of Search .................... 423/579; 372/55, 89; 422/120, 122

[56] References Cited

U.S. PATENT DOCUMENTS

| | | | |
|---|---|---|---|
| 3,211,148 | 10/1965 | Galajda, Jr. ........................... | 422/46 |
| 3,474,598 | 10/1969 | Keuls ................................ | 422/120 X |
| 3,980,762 | 9/1976 | Shiblom, Jr. et al. ............... | 423/579 |
| 4,102,950 | 7/1978 | Pilipovich et al. .................. | 423/579 |
| 4,310,502 | 1/1982 | Wagner ............................... | 423/579 |
| 4,318,895 | 3/1982 | Richardson et al. ................ | 423/579 |
| 4,342,116 | 7/1982 | MacKnight et al. ........... | 423/579 X |
| 4,434,492 | 2/1984 | Benard et al. ......................... | 372/59 |
| 4,436,715 | 3/1984 | Schaap et al. ........................ | 423/579 |
| 4,461,756 | 7/1984 | Rockenfeller ........................ | 423/579 |
| 4,558,451 | 12/1985 | McDermott et al. ................. | 372/89 |
| 4,622,676 | 11/1986 | Benard ................................ | 372/70 |
| 4,643,889 | 2/1987 | Uchiyama et al. ................... | 423/579 |
| 4,653,062 | 3/1987 | Davis et al. .......................... | 372/89 |
| 4,668,498 | 5/1987 | Davis .................................. | 423/579 |

OTHER PUBLICATIONS

Chemical Pump Advanced Concepts Program Final Report, J. E. Eninger et al, AF TR-RH-CR-80-15, 1980.
Transfer Processes, D. K. Edwards, Denny & Mills, 1973, Section 1.2.3.
Oxygen-Iodine Supersonic Technology, vol. II of III, Advanced Singlet Oxygen Generator Experimental Results and Technical Discussion, Harpole et al, AF Tech Report AFWL-TR-85-43, vol. II.

*Primary Examiner*—Peter A. Nelson
*Attorney, Agent, or Firm*—Fredric L. Sinder; Donald J. Singer

[57] ABSTRACT

A rotating disk reactor for producing singlet delta oxygen is disclosed. The reactor includes a plurality of closely spaced coaxial disks partially immersed in a pool of liquid basic hydrogen peroxide (BHP) inside a reactor vessel. A thin film of BHP is picked up and carried on the rotating disks. Chlorine gas, diluted with helium, is flowed into the reactor vessel to pass between the disks and react with the BHP to produce singlet delta oxygen. The singlet delta oxygen flows out of the reactor through a liquid separator to remove liquids and then through an impurity cold trap to remove by condensation gaseous $H_2O_2$ and $H_2O$.

4 Claims, 3 Drawing Sheets

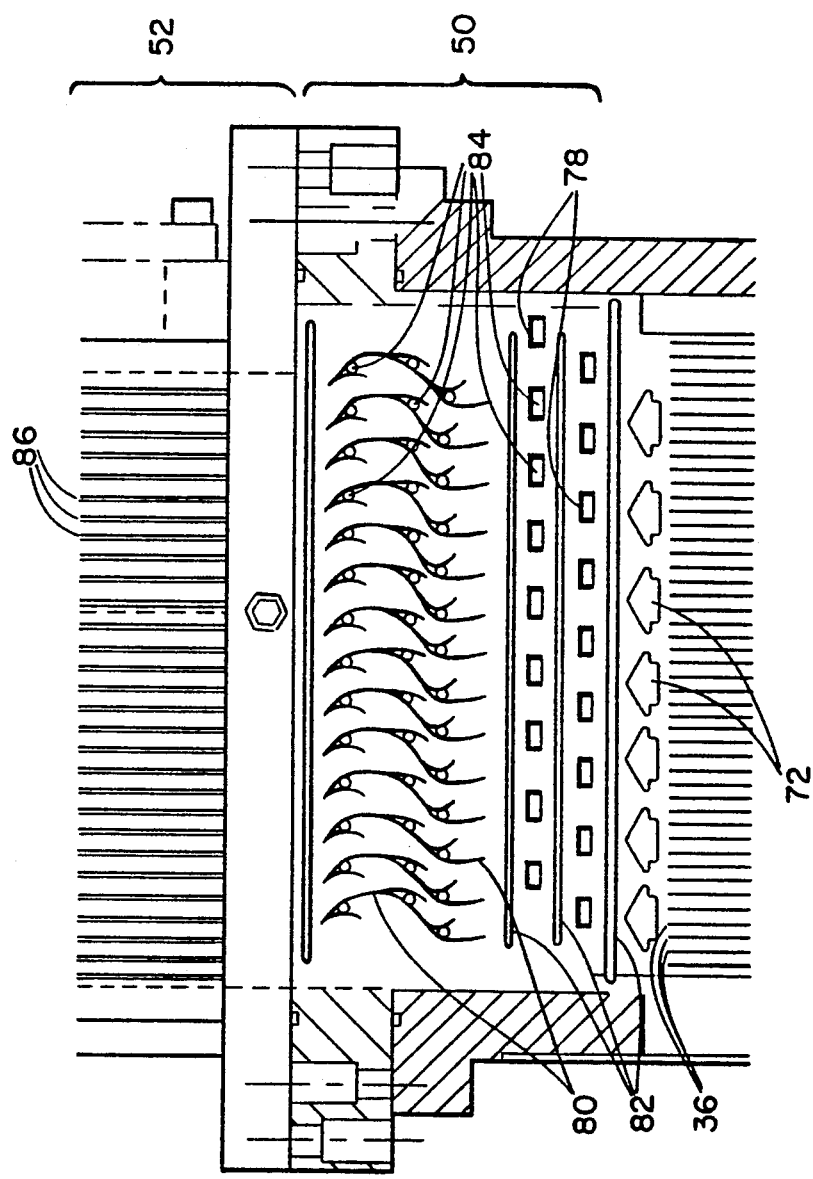

ROTATING DISK SINGLET OXYGEN GENERATOR

RIGHTS OF THE GOVERNMENT

The invention described herein may be manufactured and used by or for the Government of the United States for all governmental purposes without the payment of any royalty.

BACKGROUND OF THE INVENTION

The invention relates generally to apparatus and methods for promoting chemical processes, and more specifically to an apparatus and method for generating singlet delta oxygen.

Singlet delta oxygen, or $O_2(^1\Delta)$, is a highly reactive form of oxygen comprising singlet molecular oxygen having an excited energy state, a function of the particular arrangement of electrons around its nucleus, higher than the normal ground state of the more common oxygen molecule $O_2(^3\Sigma)$. Singlet delta oxygen is particularly useful as a necessary part of a chemical oxygen-iodine laser. It may also be used in waste treatment, purification of potable water, polymerization and chemical synthesis of oxygenated compounds.

Singlet delta oxygen is generally made by contacting chlorine gas ($Cl_2$) with an aqueous solution of basic hydrogen peroxide (basic $H_2O_2$ or BHP, a potassium or sodium hydroxide/hydrogen peroxide solution) in accordance with the equation:

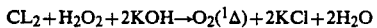

$$CL_2 + H_2O_2 + 2KOH \rightarrow O_2(^1\Delta) + 2KCl + 2H_2O$$

Unfortunately, the excited oxygen molecules are unstable and are reduced to their unusable ground state, $O_2(^3\Sigma)$, by either metal contact quenching, wall quenching, gas phase quenching or liquid phase quenching. Therefore, to generate $O_2(^1\Delta)$ both efficiently and with high yields, the contacting device, or reactor, for the gaseous and liquid reactants must provide a large interfacial area in a small volume for a short time, followed by rapid separation of the gaseous and liquid phases.

For further efficiency, a large scale singlet delta oxygen generator must provide for good thermal control of the reactor elements, reactants and reaction products/byproducts to prevent efficiency losses from heating due to the exothermic nature of the reactions.

Prior art singlet delta oxygen generators include spargers, which bubble gaseous reactants, such as chlorine gas, through liquid reactants such as basic hydrogen peroxide; sprays, which spray atomized liquid reactants into a cloud of gaseous reactants; and, wetted wall tube systems. U.S. Pat. No. 4,310,502 to Wagner is an example of an improved wetted wall tube system using a static wetted wall mixer comprising intersecting left and right-handed helical mixing elements, an attached liquid/gas separator and a low volume trap for cooling the gas stream to remove $H_2O_2$ and water vapor.

The prior art reactors suffer from various deficiencies, especially where large amounts of singlet delta oxygen need to be produced, for example, to satisfy the requirements of field-based oxygen-iodine lasers. Spargers are difficult to control. The bubble sizes cannot be varied and high gas flow rates lead to foaming. Sprays have no thermal control. The droplets heat up and more water vapor is produced than oxygen. Wetted wall tube systems require elaborate liquid distribution systems and extremely large numbers of tubes.

It is thus seen that there is a need for a singlet delta oxygen generator that is simple, efficient, easily controlled and that can be scaled to produce large amounts of singlet delta oxygen.

It is, therefore, a principal object of the present invention to provide a reactor for generating singlet delta oxygen that provides a large interfacial reaction surface in a small volume for a short time, followed by rapid separation of the gaseous and liquid phases.

It is a another object of the present invention to provide a singlet delta oxygen reactor that is easily scaled up to produce large amounts of singlet delta oxygen.

It is a further object of the present invention to provide a singlet delta oxygen reactor that has very good thermal control of the reactor elements, reactants and reaction products/byproducts.

It is a feature of the present invention that it may be modified to perform other processes for generating singlet delta oxygen, such as are described, for example, in U.S. Pat. No. 4,318,895 to Richardson et al.

It is another feature of the present invention that it may be modified to work as a reactor for producing a large variety of other gases that can be produced by the chemical reaction of a gas with a liquid.

It is an advantage of the present invention that its very good thermal control maintains a nearly uniform low liquid BHP temperature that reduces the level of water vapor impurity in the singlet delta oxygen flow and thereby increases overall system efficiency.

It is also an advantage that the straight gas flow passages result in only a small pressure drop.

It is another advantage of the present invention that it is simple to understand, operate and build.

SUMMARY OF THE INVENTION

In accordance with the foregoing principles, objects, features and advantages, the present invention provides a novel wetted rotating disk reactor for producing substantial quantities of singlet delta oxygen. The unique discovery of the present invention is that very close disk spacing of coaxial disks which are partially immersed and rotated in a standing pool of liquid BHP to pick up and carry a thin film of BHP on the disk surfaces, while chlorine gas is flowed between the disks, provides the close film-to-film spacing necessary for efficient production of $O_2(^1\Delta)$. Additionally, the rotating disks provide very good thermal control, primarily by quickly transferring the heat of reaction absorbed in the films and disks to the liquid pool.

Accordingly, the invention is directed to an apparatus comprising, and a method for using, a reactor vessel, a standing pool of liquid reactant; a plurality of closely spaced coaxial thin disks positioned inside the reactor vessel so that the disks are partially immersed in the standing pool of liquid reactant; means for rotating the disks so that a film of liquid reactant will form and be carried on the non-immersed portions of the disks; an inlet into the reactor vessel for supplying a gaseous reactant, wherein the inlet is positioned so that the gaseous reactant will flow between the non-immersed portions of the disks to react with the liquid reactant films to produce gaseous reaction products; and, an outlet for removing from the reactor vessel the gaseous reaction products.

The invention may also include means for removing liquids and liquid vapors from the gaseous reaction products.

The invention may further include means for removing impurities from the gaseous reaction products.

The invention may also further include reservoir means for holding and cooling additional liquid reactant.

The invention may additionally include means for cooling the reactor vessel.

The liquid reactant used in the invention may be aqueous basic $H_2O_2$ and the gaseous reactant may be chlorine.

DESCRIPTION OF THE DRAWINGS

The invention will be more clearly understood from a reading of the following detailed description in conjunction with the accompanying drawings wherein.

DETAILED DESCRIPTION

Figure 1:
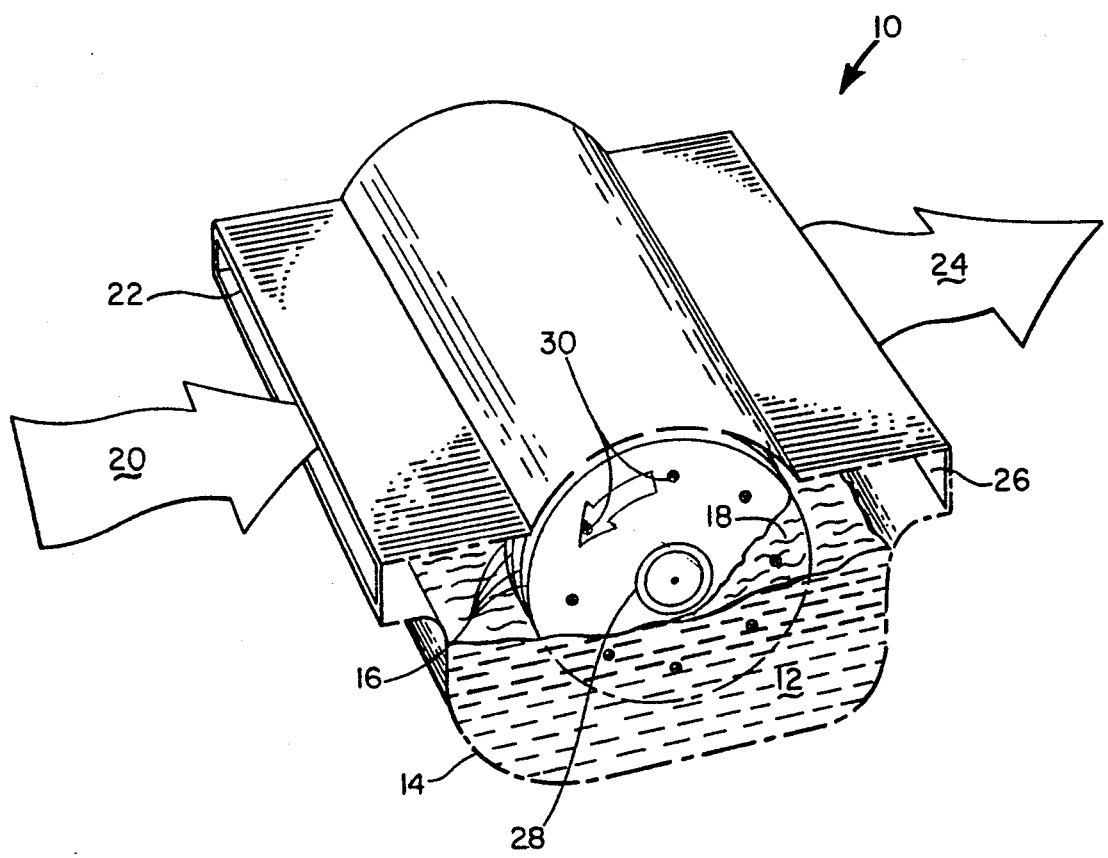
FIG. 1 shows a simplified perspective view of a singlet delta oxygen rotating disk reactor according to the teachings of the present invention.

Referring now to FIG. 1 of the drawings, there is shown a simplified perspective view of a singlet delta oxygen rotating disk reactor 10 according to the teachings of the present invention. A pool 12 of liquid basic hydrogen peroxide is held inside a reactor vessel 14. A plurality of closely spaced coaxial disks 16 are positioned inside vessel 14 and partially immersed in liquid BHP pool 12. Disks 16 are rotated so that a small amount of BHP is picked up by each disk 16 and carried as a thin film 18 on both sides of each disk 16. Chlorine gas 20 enters a vessel inlet 22 and flows in-between disks 16 to diffuse into the BHP films and react to produce $O_2(^1\Delta)$. The resulting flow 24 of $O_2(^1\Delta)$ leaves vessel 14 through an outlet 26.

Inner o-ring spacers 28 and smaller bolt 30 mounted spacers (hidden in this figure) separate disks 16 at a preselected spacing. O-rings 28 block off most of the unwetted central disk 16 regions so that the gas flow paths will have more nearly uniform wetted lengths.

In addition to the close spacing between rotating disks 16, the top and sides of vessel 14 closely enclose the outside edges of disks 16 to force all the gas to flow between disks 16.

Figure 2:
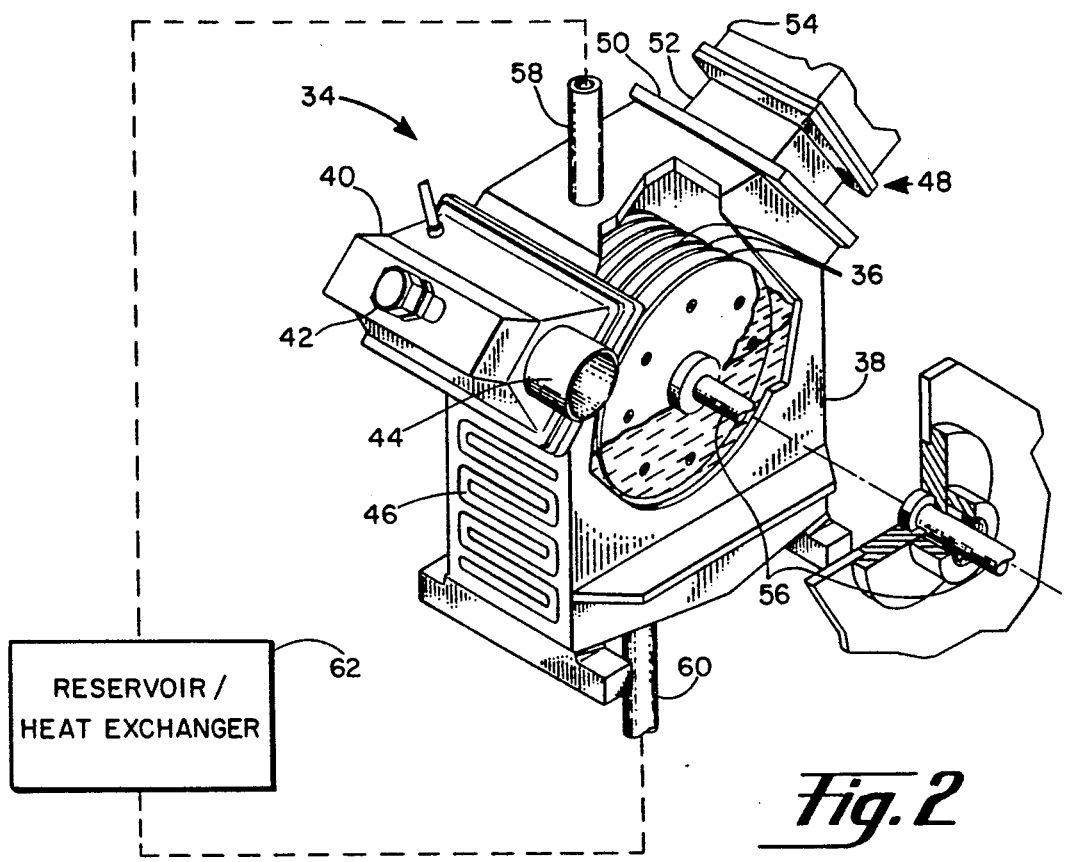
FIG. 2 shows a partially exploded more detailed perspective view of another singlet delta oxygen rotating disk reactor according to the teachings of the present invention.

FIG. 2 shows a partially exploded more detailed perspective view of another singlet delta oxygen rotating disk reactor 34 according to the teachings of the present invention. An assembly of disks 36 is positioned inside reactor vessel 38. The spacing between disks 36 is shown wider than intended for clarity. A gas inlet manifold assembly 40 includes a chlorine gas feed line 42 and a bypass vacuum and vent line connection 44 for evacuating vessel 38 prior to a reactor 34 run and for purging manifold assembly 40 and vessel 38 after a run. Coolant coils 46 provide a means for cooling reactor 34. Not shown in the figure is a perforated plate inside manifold assembly positioned normal to the flow of chlorine gas for distributing the chlorine gas into reactor vessel 38 with an uniform velocity profile. Also not shown in the figure are a water wash port, a drain port and a plurality of pressure taps and thermocouple ports that attach to manifold assembly 40.

A gas outlet manifold assembly 48 houses a liquid separator assembly 50 and an impurity cold trap assembly 52, shown in greater detail in FIG. 4. Outlet manifold assembly 50 leads to an output duct 54 from which the generated $O_2(^1\Delta)$ is supplied for its intended use. Disks 36 are mounted on a shaft 56 that provides a means for rotating the disks. BHP feed 58 and drain 60 lines provide a means for exchanging used BHP with fresh and cooled BHP from a cooled BHP reservoir and heat exchanger 62. A preliminary analysis has shown that in the typical short time, batch mode operation of a singlet delta oxygen generator, resupplying cooled BHP from a cooled reservoir should work more successfully than using coolant tubing or other means placed inside vessel 38. Coolant coils 46 mounted on the outside of reactor vessel 38 are preferably used for precooling the reactor vessel to a temperature below that of the incoming BHP so that the temperature of the BHP that the temperature of the BHP pool is not raised during the filling process. The entire reactor assembly is preferably enclosed in styrofoam or other insulation during a run.

Figure 3A:
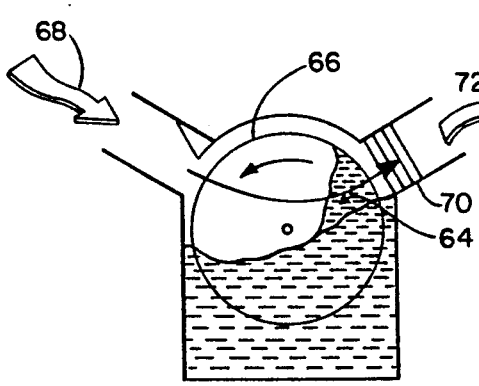
FIGS. 3a and 3b show simplified cross-sectional side views of the liquid film on the reactor disks and the gas flows past them for rotation of the disks in two different directions; and, FIG. 4 shows a top view of a liquid separator and impurity cold trap for removing liquids and impurities from the gaseous output from the reactor.
Figure 3B:
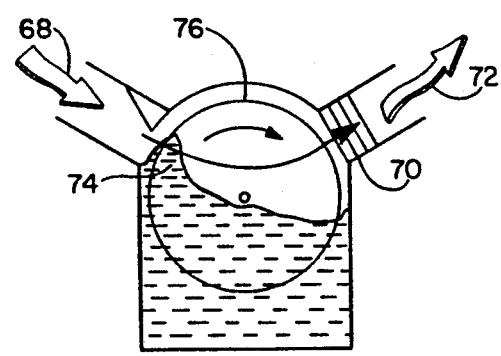

FIGS. 3a and 3b show simplified cross-sectional side views of the development of the liquid film on the rotations in two different and the gas flow past them, for rotations in two different directions. FIG. 3a shows the formation of film 64 from a counter-clockwise disk 66 rotation so that chlorine gas 68 flows counter to the direction of movement of film 64. FIG. 3b shows the formation of film 74 from a clockwise rotation of disk 76 so that chlorine gas 68 flows cooperatively with film 74. Inspection of the figures shows that the FIG. 3a counterflow increases the amount of liquid to be removed by liquid separator 70. Tests to date indicate that the FIG. 3b coflow rotation produces generally better results, although lowering the BHP level in reactor 34, and other modifications as may occur to those with skill in the art, will improve counterflow performance.

A particular problem during operation of the reactor is foaming of the BHP. Foaming is aggravated by the very low pressures during reactor operation from a few torr (1/760 of standard atmospheric pressure) to a few tens of torr. Foaming, and overflow from bubbles inside the solution, limits the maximum practical rate of rotation of disks 36 to about 30 rpm to avoid flooding liquid separator 50 discussed below. The foaming problem can to some extent be alleviated by reducing the BHP level in vessel 38 and by exposing the BHP to chlorine, which forms KCL in the BHP solution. In any event, careful handling and careful control of pressure decreases is always required.

FIG. 4 shows a top view of wave plate liquid separator 50 and impurity cold trap 52 for removing liquids and impurities from the gaseous output from reactor 34. The output flow 72 from the assembly of rotating disks 36 enters liquid separator 50 and first strikes and flows past a pair of rows of interleaving baffle strips 78, then strikes and flows past a series of wave plates 80. Gasborne liquids are physically trapped in baffles 78 and at wave plate locations 80 and fall to be removed through drainage slots 82 and holes 84 at the bottom of liquid separator 50. The drained liquids, primarily BHP, are returned to the pool of BHP.

Lastly, the liquid-separated output flow 72 flows through and past a plurality of chilled fins 86 which make up impurity cold trap 52. Impurity cold trap 52 works primarily by condensing gaseous $H_2O_2$ and $H_2O$, which have lower vapor pressures than $O_2(^1\Delta)$ and will therefore condense sooner, so that an essentially dry $O_2(^1\Delta)$ is available through output duct 54.

As discussed previously, the very good thermal control provided by the present invention maintains a nearly uniform low temperature of the pool of BHP. This reduces the water vapor load on impurity cold trap 52 so that a lower performance trap may be used with a corresponding decrease in pressure drop across trap 52 and an increase in overall system performance.

Materials are selected for their chemical compatibility, thermal and structural properties. The gas inlet manifold is made of Inconel 718 with Inconel 600 fittings. The reactor vessel, shaft and disks are of Nickel 200. The disk spacers are FEP Teflon-coated Nickel 200, and the shaft bearings are glass-filled Teflon. The liquid separator is made of FEP Teflon-coated nickel-plated copper and the cold trap housing is FEP Teflon-coated CRES 304L. Ducts are FEP Teflon-coated CRES 304L. Connections to the reactor are made using Teflon tubing for gaseous and liquid reactants and metal plumbing for vacuum and gas purges. FEP Teflon may also be advantageously used to coat the interiors of various sections of the reactor.

An improved understanding of the operation of the invention will be provided from study of the following example of the use of the disclosed apparatus to produce singlet delta oxygen. The given dimensions and operating parameters are given by way of example and not limitation.

A disk assembly of 57 disks 0.89 mm thick and 38.0 cm in diameter were assembled with a 2.5 mm spacing between disks. The disks were placed inside a reactor vessel sized to hold 0.028 $m^3$ of BHP when filled to a level of 5.7 cm below the centerline of the shaft upon which the disks were mounted. The reactor was further sized so that its roof was closely fitted to the circumference of the disk assembly, the measured fit being within 2 mm.

BHP was prepared in a mix tank by mixing 18.9 kg of 90% wt/wt $H_2O_2$, 36 kg of 50% wt/wt KOH and 9.6 kg of distilled water at a maximum temperature of 10° C. The BHP was cooled to −15° C. and flowed into the reactor to 7.2 cm below the disk shaft centerline. The pressure in the reactor was then slowly (about 30 minutes) lowered to about 3 torr. Foaming was fairly well controlled during this process.

By way of example and not limitation, the following tables presents the results of a number of representative runs of the tested reactor and the molar ratio of $O_2(^1\Delta)$ to $O_2(^3\Sigma)$ of the output. In a typical test, 300 moles of $Cl_2$, diluted with Helium, were flowed though the reactor in 727 seconds.

| INPUT FLOWS | | | OUTPUT FLOWS | | | | |
|---|---|---|---|---|---|---|---|
| mol/ sec He | mol/ sec $Cl_2$ | Percent Util of $Cl_2$ | Partial Pressures (torr) | | | | Singlet Delta Fraction |
| | | | Total | $H_2O$ | $O_2$ | $O_2(^1\Delta)$ | |
| 0.99 | 0.43 | 98 | 19 | 1.8 | 5.2 | 3.6 | 0.69 |
| 0.98 | 0.48 | 96 | 27 | 1.7 | 8.1 | 5.2 | 0.64 |
| 1.02 | 0.73 | 88 | 37 | 1.9 | 12.9 | 6.8 | 0.53 |

-continued

| INPUT FLOWS | | | OUTPUT FLOWS | | | | |
|---|---|---|---|---|---|---|---|
| mol/ sec He | mol/ sec $Cl_2$ | Percent Util of $Cl_2$ | Partial Pressures (torr) | | | | Singlet Delta Fraction |
| | | | Total | $H_2O$ | $O_2$ | $O_2(^1\Delta)$ | |
| 1.04 | 0.73 | 87 | 35 | 0.8* | 12.2 | 6.6 | 0.54 |
| 1.45 | 0.73 | 90 | 39 | 1.0* | 11.5 | 6.8 | 0.59 |
| 0.94 | 0.47 | 92 | 22 | 0.7* | 6.5 | 4.3 | 0.66 |

*impurity cold trap refrigeration system on

7M KOH BHP was used for the above tests because 9M KOH BHP decomposed in the reactor. 9M KOH BHP has a lower freezing point and its higher concentration will produce more efficient chlorine utilization. The higher freezing point of 7M KOH BHP tightens the thermal control restrictions of the apparatus.

The reactor may be further modified to tilt the reactor vessel relative to the input and exhaust connections to reduce the problem of foaming and overloading of the liquid separator. These modifications, and improvements in liquid separators, will allow faster disk rotation speeds and higher performance levels.

A further improvement in reactor performance may be achieved by providing for regeneration of the BHP, which is not completely depleted by the reactions. Regeneration can be achieved by reaction of the BHP, for example, with $K_2O_2$.

The use of the terms liquid reactant and gaseous reactant is intended to include plural liquid and gaseous reactants and mixtures of desired active reactants with other non-active materials and other reactants. Similarly, aqueous, or liquid, basic $H_2O_2$ includes not only a solution with KOH or NaOH, but also other basic $H_2O_2$ solution such as, for example, are described in U.S. Pat. No. 4,318,895 to Richardson et al.

The disclosed reactor successfully demonstrates the use of a closely spaced rotating disk reactor to efficiently produce singlet delta oxygen. Although the disclosed use is specialized, it will find application in other areas where a large reaction surface area and minimum contact of the reaction products with other reactor components is required.

It is understood that modifications to the invention as described may be made, as might occur to one with skill in the field of the invention. Therefore, all embodiments contemplated have not been shown in complete detail. Other embodiments may be developed without departing from the spirit of the invention or from the scope of the claims.

I claim:

1. A method for generating singlet delta oxygen, comprising the steps of:
   (a) providing an enclosure;
   (b) providing a plurality of closely spaced coaxial disks inside the enclosure;
   (c) partially filling the enclosure with aqueous basic $H_2O_2$ to a sufficient level so that the disks are partially immersed in the aqueous basic $H_2O_2$;
   (d) rotating the disks so that a film of the aqueous basic $H_2O_2$ is formed and carried on non-immersed portions of the disks; and,
   (e) flowing chlorine gas between the non-immersed portions of the rotating disks to react with the aqueous basic $H_2O_2$ to produce singlet delta oxygen.

2. The method for generating singlet delta oxygen according to claim 1, the produced singlet delta oxygen being accompanied by other reaction products including unreacted chlorine gas, gas-borne liquids, other liquid vapors and other byproducts, further comprising the step of flowing the reaction products through a liquid separator to remove the gas-borne liquids from the reaction products.

3. The method for generating singlet delta oxygen according to claim 1, the produced singlet delta oxygen being accompanied by other reaction products including unreacted chlorine gas, gas-borne liquids, other liquid vapors and other byproducts, further comprising the step of flowing the reaction products through a cold trap to condense the other liquid vapors out of the reaction products.

4. The method for generating singlet delta oxygen according to claim 1, further comprising the step of regenerating aqueous basic $H_2O_2$, depleted by the reaction with the chlorine gas, by reacting the depleted $H_2O_2$ with $K_2O_2$.

* * * * *

UNITED STATES PATENT AND TRADEMARK OFFICE
CERTIFICATE OF CORRECTION

PATENT NO. : 5,229,100
DATED : July 20, 1993
INVENTOR(S) : George M. Harpole

It is certified that error appears in the above-identified patent and that said Letters Patent is hereby corrected as shown below:

Column 4, lines 31-32, "rotations in two different" should be --- rotating reactor disks ---.

Signed and Sealed this

Eighteenth Day of April, 1995

Attest:

BRUCE LEHMAN

Attesting Officer

Commissioner of Patents and Trademarks